United States Patent
Chang

(10) Patent No.: US 7,790,253 B2
(45) Date of Patent: Sep. 7, 2010

(54) WEAR-RESISTIVE HOUSING FOR A PORTABLE ELECTRONIC DEVICE

(75) Inventor: Wen-Lie Chang, Taipei (TW)

(73) Assignee: PixArt Imaging Incorporation, Hsin-Chu (TW)

( * ) Notice: Subject to any disclaimer, the term of this patent is extended or adjusted under 35 U.S.C. 154(b) by 1164 days.

(21) Appl. No.: 11/405,105

(22) Filed: Apr. 17, 2006

(65) Prior Publication Data

US 2007/0243349 A1 Oct. 18, 2007

(51) Int. Cl.
*B32B 27/08* (2006.01)
*B05D 3/02* (2006.01)

(52) U.S. Cl. .......... 428/35.7; 428/34.4; 427/376.6; 419/2; 977/900

(58) Field of Classification Search ............ 428/35.7, 428/34.4; 427/376.6; 419/2; 977/900
See application file for complete search history.

(56) References Cited

U.S. PATENT DOCUMENTS 3,829,260 A * 8/1974 Shimoda ............... 418/178

* cited by examiner

*Primary Examiner*—Robert D. Harlan
(74) *Attorney, Agent, or Firm*—Tung & Associates

(57) ABSTRACT

The present invention discloses a wear-resistive housing for a portable electronic device. The housing is made of a wear-resistive plastic molding material, or made of a rigid or plastic material on which is coated a wear-resistive coating. The wear-resistive plastic molding material or the wear-resistive coating includes a hardness-improving additive selected from the group consisting of zirconium dioxide, boron nitride, tungsten carbide, silicon carbide, and mixtures of two or more of the above.

16 Claims, 1 Drawing Sheet

WEAR-RESISTIVE HOUSING FOR A PORTABLE ELECTRONIC DEVICE

BACKGROUND OF THE INVENTION

1. Field of the Invention

The present invention relates to a wear-resistive housing for a portable electronic device, and more particularly to a low cost wear-resistive housing for a portable electronic device, which contains a hardness-improving additive. In addition to the wear-resistive characteristic, the housing may contain other additives to provide effects or characteristics such as improved surface smoothness for scratch protection, anti-bacterium effect, negative ion generation, anti-ultra-violet ray (referred to hereinafter as "anti-UV") effect, anti-electromagnetic interference (referred to hereinafter as "anti-EMI") effect, flame retardant effect, odor and humidity absorption effect, improved insulation, far infrared ray (referred to hereinafter as "far IR") generation, etc.

2. Description of the Related Art

Portable electronic devices such as mobile phones, PDA's (Personal Digital Assistants), digital cameras, notebook computers, and so on, have almost become necessaries in our daily life. However, there is a disadvantage common to these portable electronic devices, that is, the housing of a portable electronic device is easily and often worn to lose the elegance its original design.

Due to cost concern, the housing of a portable electronic device is often made of injection molding plastic materials such as PC (polycarbonate) or ABS (Acrylonitrile Butadiene Styrene). To provide different colors in the appearance, another approach is to coat the housing with a coating made of a material such as epoxy resin, PU resin (polyurethane resin), or PMMA resin (polymethyl methacrylate resin).

Because the housing of a portable electronic device is often made of a plastic or resin material, its hardness is not satisfactory. A housing made of PC or ABS has a hardness generally in a range of 2H-2.5H, which can not achieve the desired wear-resistive effect. This is why we often see a mobile phone with worn traces.

The aforementioned disadvantage has long been known by those in this art. One possible solution thereto is to make the housing by magnesium-aluminum alloy. This may improve the hardness of the housing to 5H, but the material cost is 20-30 times of the cost of the plastic or resin material, which is of course undesired. Another possible solution is to mix plastic and/or resin materials to improve hardness, but the resultant hardness may at most be improved to about 2.5H-3H, far below what is desired. Until the present invention, there has not been any satisfactory solution to improve hardness of a housing made of a plastic or resin material, or a mixture material of plastic(s) and/or resin(s).

SUMMARY OF THE INVENTION

In view of the foregoing, it is an object of the present invention to provide a low cost wear-resistive housing for a portable electronic device.

In accordance with the above object, the present invention provides a wear-resistive housing for a portable electronic device, in which the housing is made of a wear-resistive plastic molding material, or made of a rigid or plastic material on which is coated a wear-resistive coating. The wear-resistive plastic molding material or the wear-resistive coating includes a hardness-improving additive selected from the group consisting of zirconium dioxide, boron nitride, tungsten carbide, silicon carbide, and mixtures of two or more of the above.

According to the present invention, in addition to the hardness-improving additive, the housing may contain other additives to provide effects or characteristics such as improved surface smoothness for scratch protection, anti-bacterium effect, negative ion generation, anti-UV effect, anti-EMI effect, flame retardant effect, odor and humidity absorption effect, improved insulation, or far IR generation.

More specifically, according to a first aspect of the present invention, a housing of a portable electronic device is made of a molding material which contains a hardness-improving additive of about 0.5 wt % to about 10 wt %. The hardness-improving additive is preferably a material selected from the group consisting of zirconium dioxide, boron nitride, tungsten carbide, silicon carbide, and mixtures of two or more of the above. It is more preferable that the ratio of the hardness-improving additive is in a range of about 1 wt % to about 3 wt % in the molding material.

According to a second aspect of the present invention, a housing of a portable electronic device is made of a molding material which contains a hardness-improving additive having a particle size of about or below 100 nm (nanometer) in diameter. The hardness-improving additive is preferably a material selected from the group consisting of zirconium dioxide, boron nitride, tungsten carbide, silicon carbide, and mixtures of two or more of the above.

According to a third aspect of the present invention, a housing of a portable electronic device is made of a molding material which contains a hardness-improving additive uniformly distributed in the molding material. The hardness-improving additive is preferably a material selected from the group consisting of zirconium dioxide, boron nitride, tungsten carbide, silicon carbide, and mixtures of two or more of the above.

According to a fourth aspect of the present invention, a housing of a portable electronic device is made of a housing body on which is coated a coating material which contains a hardness-improving additive of about 0.5 wt % to 10 wt %. The hardness-improving additive is preferably a material selected from the group consisting of zirconium dioxide, boron nitride, tungsten carbide, silicon carbide, and mixtures of two or more of the above. It is more preferable that the ratio of the hardness-improving additive is in a range of about 1 wt % to about 3 wt % in the coating material.

According to a fifth aspect of the present invention, a housing of a portable electronic device is made of a housing body on which is coated a coating material which contains a hardness-improving additive having a particle size of about or below 100 nm (nanometer) in diameter. The hardness-improving additive is preferably a material selected from the group consisting of zirconium dioxide, boron nitride, tungsten carbide, silicon carbide, and mixtures of two or more of the above.

According to a sixth aspect of the present invention, a housing of a portable electronic device is made of a housing body on which is coated a coating material which contains a hardness-improving additive uniformly distributed in the coating material. The hardness-improving additive is preferably a material selected from the group consisting of zirconium dioxide, boron nitride, tungsten carbide, silicon carbide, and mixtures of two or more of the above.

DESCRIPTION OF THE PREFERRED EMBODIMENT

Figure 1:
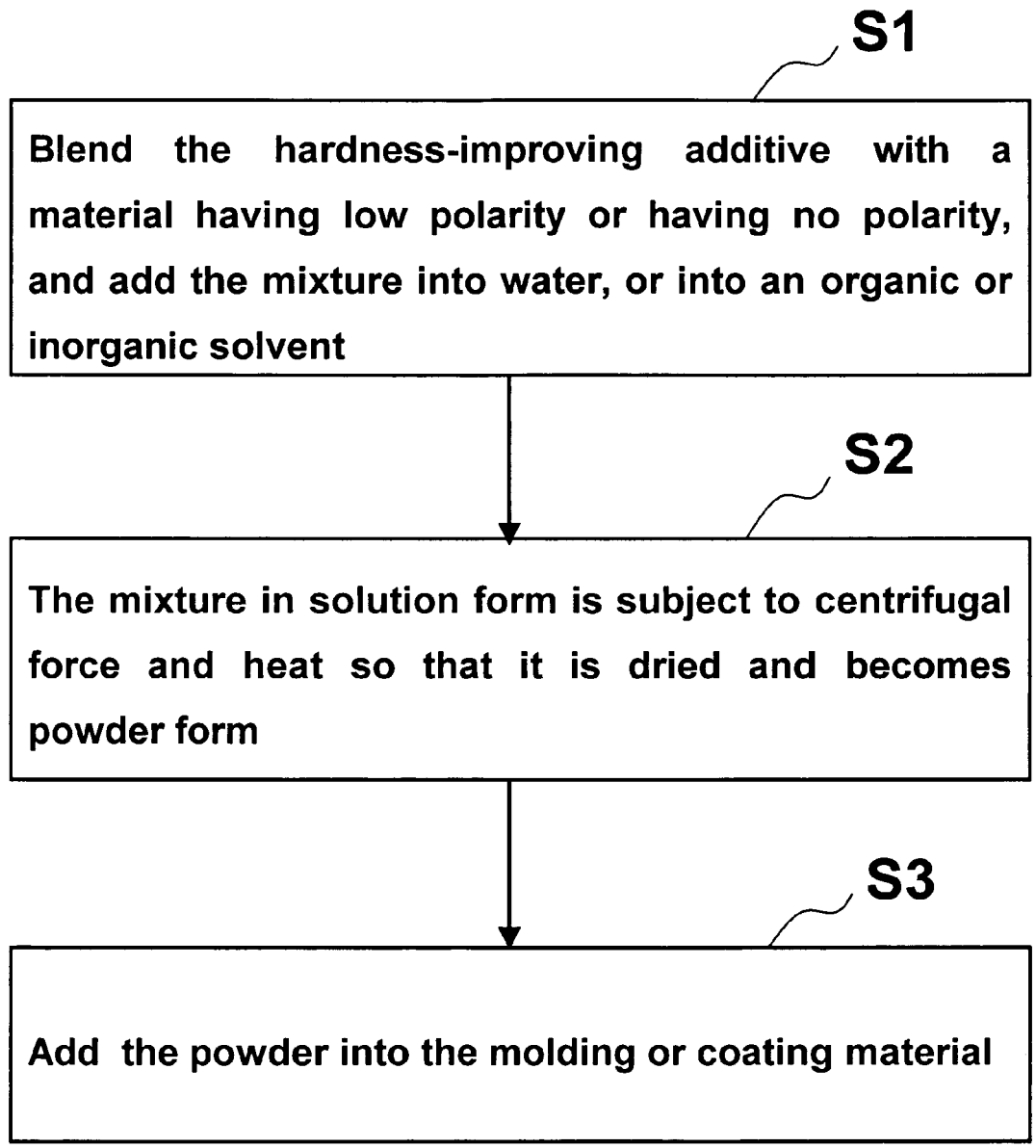
FIG. 1 shows a process for preparing the hardness-improving additive so that it may be more uniformly distributed in the molding material or coating material.

The present invention is now described in accordance with its preferred embodiments. It should be understood, however, that the embodiments are only illustrative rather than limiting.

The primary inventive step of the present invention is to add a hardness-improving additive into the molding material making the housing of a portable electronic device, or to add a hardness-improving additive into the coating material coated on the body of a housing of a portable electronic device.

According to the present invention, it is found that there are three conditions which may affect the effect of the hardness-improving additive, i.e., how much the hardness-improving additive improves the hardness of the molding or coating material. The three conditions include: (1) ratio of the additive in the molding or coating material; (2) particle size of the additive; and (3) uniformity of the additive when dispersed in the molding or coating material. The three conditions do not have to be met concurrently. For instance, if the additive is uniformly distributed in the molding or coating material, then its particle size or ratio in the molding or coating material is not very critical. As another example, if the particle size of the additive is in nanometer scale (that is, having a diameter of about 1 nm to about 100 nm) or below, the hardness of the housing is significantly improved.

It is found by the inventor that the hardness-improving additive may be a material selected from the group consisting of zirconium dioxide, boron nitride, tungsten carbide, and silicon carbide. It is also found that mixtures of two or more of the above also provide hardness-improving effect.

When a housing of a portable electronic device is made of an injection molding material, the additive may be added during manufacture of the molding material, or during injection molding of the housing. When a housing of a portable electronic device is made of a housing body coated with a coating, the additive may be added to the coating material. In the latter case, the coating material generally contains volatile composition which when vaporized will carry some of the additive composition away. In the present invention, it is less critical what the original composition is, but more critical that the coating material remaining on the housing body meets at least one of the abovementioned conditions, that is, the additive in the coating material is in the ratio range described in the present invention, or the additive has a particle size in nanometer scale or below, or the additive is uniformly distributed in the coating material.

More specifically, the additive in the molding or coating material should meet one of the following conditions: (1) the additive is in a ratio range of about 0.5 wt % to about 10 wt % in the molding or coating material, and preferably about 1 wt % to about 3 wt % in the molding or coating material, for the reason that the hardness is not significantly improved if the added amount of the additive is too low, while the property and the mechanical strength of the molding material is degraded if the added amount of the additive is too high; (2) the additive has a particle size of a diameter of about 100 nm or below; and (3) the additive is uniformly distributed in the molding or coating material.

There are several methods to uniformly distribute the additive in the molding or coating material; the key is to reduce or remove the polarity of the additive. As an example, one method is shown in FIG. 1 for pre-processing the additive so as to reduce or remove its polarity. Referring to step S1, the hardness-improving additive in powder form is blended with a material with low or no polarity, such as saturated fatty acid, unsaturated fatty acid, or phosphoric ester. The blended mixture may be subsequently added into water, or an organic or inorganic solvent. Next, in step S2, the blended mixture in solution form is subject to centrifugal force and heat so that it is dried and becomes powder form. The hardness-improving additive powder thus formed is coated with the material of low polarity or no polarity. In step S3, the hardness-improving additive powder having been pre-processed as above is added into the molding or coating material, and it is found that the additive is more uniformly distributed in the molding or coating material. The reason for the uniform distribution effect is that, the hardness-improving additives according to the present invention, such as zirconium dioxide, boron nitride, tungsten carbide, and silicon carbide, are all materials with polarity, while the typical molding or coating materials are materials without polarity. Therefore, if the polarity of the hardness-improving additive is reduced or removed before it is added into the molding or coating material, more uniform distribution may be achieved.

According to the present invention, the hardness-improving additive may be added into a low cost plastic injection molding material such as PC, ABS, or PMMA, or added into a low cost coating material such as epoxy resin, PU resin or PMMA resin, so that a housing of a portable electronic device may be made under a much lower cost, but with comparable hardness, as compared with a housing made of magnesium-aluminum alloy.

In addition to the above additive for improving hardness so that a housing is more wear-resistive, the housing may contain other additives to provide other effects or characteristics. A first possible option is to add an additive to increase surface smoothness of the housing, so that the housing is not only wear-resistive but also scratch-free. Examples of such material for increasing surface smoothness include silicon dioxide, sulfides (such as molybdenum disulfide), fluorides, and mixtures of two or more of the above. There is more negative concern to fluorides than other materials mentioned above, and there are international regulations governing the use of fluorides. One skilled in this art may determine which material to use according to his best judgment.

According to the present invention, it is another possible option to add an anti-bacterium material into the molding or coating material, which may be a photo catalysis material or a material in nanometer scale with anti-bacterium characteristic. The sizes of most kinds of bacteria are in the range of about 200 nm to about 400 nm, and due to the small particle size of the material in nanometer scale, it can kill those bacteria. Further, if the material in nanometer scale has a particle size even smaller than 20 nm (in diameter), it is capable of killing viruses having a size of about 20 nm or above. Examples of such photo catalysis material for anti-bacterium effect include zinc oxide, titanium dioxide, and mixtures thereof; examples of such material in nanometer scale for anti-bacterium effect include nanometer scale silver particles.

A further optional additive according to the present invention is a material for negative ion generation. Negative ions may neutralize positive charges around or on a human body to comfort the body. Moreover, it is even better to add such negative ion generation additive in the housing of a portable electronic device, because the housing of a portable electronic device is often subject to friction, which helps to release more ions. Examples of such material for negative ion generation include tourmaline and mixture of tourmaline and clay, which may be added into the molding or coating material in powder form.

Besides the above, according to the present invention, it is another possible option to add an anti-UV material into the molding or coating material, protecting the plastic housing from destruction (that is, preventing the molding or coating material from degradation or decomposition). Examples of such anti-UV material include zinc oxide, titanium dioxide, any metal, and mixtures of two or more of the above.

In addition, according to the present invention, it is also possible to add an anti-EMI material into the molding or coating material, protecting the human body. Examples of such anti-EMI material include iron oxide, carbon powder, any metal, and mixtures of two or more of the above.

Moreover, according to the present invention, it is also possible to add a flame retardant material into the molding or coating material, for more safety. Such flame retardant material usually includes a primary composition for isolating oxygen, such as aluminum hydroxide, magnesium hydroxide, or mixtures thereof, and a secondary composition for increasing viscosity, such as silicon dioxide. A mixture of the main composition and the secondary composition may be added into the molding or coating material for flame retardant effect.

Furthermore, according to the present invention, it is also possible to add a material with odor and humidity absorption effect into the molding or coating material. Examples of such material with odor and humidity absorption effect include active carbon, bamboo charcoal, porous silicate, porous ceramic material such as vermiculite, zeolite, and diatomite, and mixtures of two or more of the above.

In addition, according to the present invention, it is also possible to add an insulating material into the molding or coating material, for improving insulation and protecting the human body. Examples of such insulating material include zinc oxide, silicon dioxide, aluminum oxide, silicide, any ceramic material, and mixtures of two or more of the above.

Furthermore, according to the present invention, it is also possible to add a material generating far IR ray into the molding or coating material, to warm and comfort a human body. The material should preferably have a far IR radiation rate of 90% or above. An example of such material generating far IR ray is the far IR powder produced by PaiKong® Co. Ltd., Taiwan.

In addition to the above additives, according to the present invention, it is also possible to add calcium carbonate into the molding or coating material. Calcium carbonate does not provide any particular function or effect, but serves only as a low cost filler to reduce cost.

The aforementioned additives and the preferred weight ratio of these additives in the molding or coating material are summarized in the following table 1.

TABLE 1

| Effect | | Material | Minimum wt % | Preferred wt % Range |
|---|---|---|---|---|
| Surface Smoothness | | silicon dioxide, sulfides, fluorides, and mixtures of two or more of the above | 500 ppm | 500 ppm or more |
| Anti-Bacterium (Photo Catalysis Material) | | zinc oxide, titanium dioxide, and mixtures thereof | 200 ppm | 200 ppm-10000 ppm |
| Anti-Bacterium (Nanometer Scale Material) | | nanometer scale silver particles | 1 ppm | 1 ppm-500 ppm |
| Negative Ion Generation | | tourmaline powder, or mixture of tourmaline and clay | 1% | 1%-20% |
| Anti-UV | | zinc oxide, titanium dioxide, any metal, and mixtures of two or more of the above | 0.1% | 0.1%-5% |
| Flame Retardant | Primary Composition | aluminum hydroxide, magnesium hydroxide, or mixtures thereof | 20% | 20%-70% |
| | Secondary Composition | silicon dioxide | 0.5% | 0.5%-5% |
| Anti-EMI | | iron oxide, carbon powder, any metal, and mixtures of two or more of the above | 10% | 10%-45% |
| Odor and Humidity Absorption | | active carbon, bamboo charcoal, porous silicate, vermiculite, zeolite, diatomite, and mixtures of two or more of the above | 0.1% | 0.1%-5% |
| Improved Insulation | | zinc oxide, silicon dioxide, aluminum oxide, silicide, any ceramic material, and mixtures of two or more of the above | 0.1% | 0.1%-10% |
| Far IR Generation | | far IR powder by PaiKong ® | 0.1% | 0.1%-10% |
| Filler | | calcium carbonate | any amount | any amount |

Following are selected examples to demonstrate the effects of the present invention.

EXAMPLE 1

A sample is made of a material having the following composition ratio by weight: (plastic molding material):(zirconium dioxide):(zinc oxide)=98.5:1:0.5. The sample is tested and found to have a hardness exceeding 5H, similar to or even better than the hardness of magnesium-aluminum alloy. When the sample is placed under visible light, it is found that 99.5% or more of staphylococcus aureaus are killed. In addition, the composition of zinc oxide provides anti-UV effect to prevent the plastic molding material from degradation or decomposition.

EXAMPLE 2

A sample is made of a material having the following composition ratio by weight:(molding material):(zirconium dioxide):(zinc oxide):(calcium carbonate)=98.5:1:0.25:0.25. The sample is tested and also found to have a hardness exceeding 5H, similar to or even better than the hardness of magnesium-aluminum alloy. The sample is also found to have an anti-bacterium effect similar to the sample prepared in Example 1.

EXAMPLE 3

A sample is made of a material having the following composition ratio by weight: (molding material):(zirconium dioxide):(zinc oxide):(silicon dioxide)=98.5:0.5:0.4:0.6. The sample is found to have a hardness of about 4H, far exceeding the commonly used plastic materials. In addition, the sample has a smooth surface resistive to scratches. Similar smoothness is found by replacing the composition of silicon dioxide by molybdenum disulfide.

EXAMPLE 4

Replace zirconium dioxide by boron nitride, tungsten carbide, and silicon carbide, while no other additive is added. The composition ratio by weight is (molding material):(wear-resistive additive)=98:2. Similar hardness to that in Example 1 is achieved, but no anti-bacterium effect is found.

EXAMPLE 5

A mixed powder of zirconium dioxide, nanometer scale silver particles, silicon dioxide, and mixture of tourmaline and clay is added into a coating material which is subsequently coated on a test body having a dimension of 5 cm×5 cm×2 mm. The final composition ratio by weight is (coating material):(zirconium dioxide):(nanometer scale silver particles):(silicon dioxide):(mixture of tourmaline and clay)=94:1:0.05:0.1:4.85. It is found that the test body provides wear-resistive effect, scratch protection effect, and anti-bacterium effect. In addition, the body is measured and found to have a negative ion concentration of more than 600 ea/cc.

EXAMPLE 6

A mixed powder of zirconium dioxide, nanometer scale silver particles, zinc oxide, active carbon, and mixture of tourmaline and clay is added into a coating material which is subsequently coated on a test body having a dimension of 5 cm×5 cm×2 mm. The final composition ratio by weight is (coating material):(zirconium dioxide):(nanometer scale silver particles):(zinc oxide) (active carbon):(mixture of tourmaline and clay)=89:1:0.1:1:0.9:8. It is found that the test body provides wear-resistive effect, anti-bacterium effect, and odor absorption effect. In addition, the body is measured and found to have a negative ion concentration of more than 1200 ea/cc.

EXAMPLE 7

Add nanometer scale zirconium dioxide powder into a coating material which is subsequently coated on a test body. The hardness of the body is found to exceed 5H.

EXAMPLE 8

Mix a molding material with nanometer scale zirconium dioxide powder, mixture of aluminum hydroxide and magnesium hydroxide in powder form, and silicon dioxide in sheet form, and form a test body by injection molding, wherein the composition ratio by weight is (molding material):(zirconium dioxide):(mixture of aluminum hydroxide and magnesium hydroxide):(silicon dioxide)=57:0.5:40:2.5. It is found that the test body has a hardness of about 4H. The test body is subject to flame test for 10 minutes and found that the body does not flame nor trickle down.

The composition ratio of the mixture of aluminum hydroxide and magnesium hydroxide in the molding material is decreased to 20%. It is found that the flame retardant effect is still acceptable.

EXAMPLE 9

Mix nanometer scale zirconium dioxide powder, nanometer scale iron oxide powder, and nanometer scale nickel powder, with a molding material and form a test body by injection molding, wherein the composition ratio by weight is (molding material):(zirconium dioxide):(iron oxide):(nickel)=69:1:24:6. The test body is found to have a hardness exceeding 5H, and an anti-EMI effect of −20 dB or more in the range of 0.9 GHz to 1.8 GHz.

EXAMPLE 10

Pre-process submicron scale zirconium dioxide powder (i.e., particle size below 1 micron but above 100 nanometer, in diameter) to reduce/remove its polarity. The pre-processed powder is added into a molding material, and found to be uniformly distributed in the material. The molding material is used to make a sample and found to have a hardness exceeding 5H.

Since the primary object of the present invention is to provide the wear-resistive effect, examples of fine adjustments of the additives other than the hardness-improving additive are omitted for simplicity of the specification.

As seen from the foregoing description, the present invention significantly increases the hardness of a housing, and thus achieves the desired wear-resistive effect, by adding a hardness-improving additive into a low cost molding or coating material. In addition to the hardness-improving additive, the housing may contain other additives to provide effects such as improved surface smoothness for scratch protection, anti-bacterium effect, negative ion generation, anti-UV effect, anti-EMI effect, flame retardant effect, odor and humidity absorption effect, improved insulation, or far IR generation.

The features, characteristics and effects of the present invention have been described with reference to its preferred embodiments, which are illustrative of the invention rather than limiting of the invention. Various other substitutions and modifications will occur to those skilled in the art. Therefore, all such substitutions and modifications are intended to be embraced within the scope of the invention as defined in the appended claims.

What is claimed is:

1. A wear-resistive housing for an electronic device, the housing being made of a molding material comprising a hardness-improving additive of about 0.5 wt % to about 10 wt %, wherein said hardness-improving additive is one selected from the group consisting of: zirconium dioxide, boron nitride, tungsten carbide, and mixtures of two or more of the above.

2. The wear-resistive housing of claim 1, wherein said hardness-improving additive has a particle size of about 100 nm or less in diameter.

3. The wear-resistive housing of claim 1, wherein said molding material further comprises a surface smoothness material selected from the group consisting of silicon dioxide, sulfides, fluorides, and mixtures of two or more of the above.

4. The wear-resistive housing of claim 3, wherein said molding material contains 500 ppm or more of said surface smoothness material.

5. The wear-resistive housing of claim 1, wherein said molding material contains a material selected from the group consisting of:
   A. anti-bacterium nanometer scale materials having a particle size of about 100 nm or less in diameter;
   B. photo catalysis materials;
   C. negative ion generation materials;
   D. anti-electromagnetic interference materials;
   E. flame retardant materials;
   F. odor and humidity absorption materials;
   G. anti-ultra violet ray materials;
   H. insulation improving materials;
   I. far infrared ray generation materials; and
   J. mixtures of two or more of the above materials.

6. The wear-resistive housing of claim 1, wherein said molding material contains a material selected from the group consisting of:
   A. nanometer scale silver particles in a range of about 1 ppm to about 500 ppm;
   B. zinc oxide, titanium dioxide, or mixtures thereof, in a range of about 200 ppm to about 10,000 ppm;
   C. zinc oxide, titanium dioxide, any metal, or mixtures of two or more thereof, in a range of about 0.1% to about 5%;
   D. tourmaline powder, or mixture of tourmaline and clay, in a range of about 1% to about 20%;
   E. iron oxide, carbon powder, any metal, or mixtures of two or more thereof, in a range of about 10% to about 45%;
   F. aluminum hydroxide, magnesium hydroxide, or mixtures thereof, in a range of about 20% to about 70%, and silicon dioxide, in a range of about 0.5% to about 5%;
   G. active carbon, bamboo charcoal, porous silicate, vermiculite, zeolite, diatomite, or mixtures of two or more of the above, in a range of about 0.1% to about 10%; and
   H. mixtures of two or more of the above materials.

7. The wear-resistive housing of claim 1, wherein said molding material is one selected from the group consisting of polycarbonate, acrylonitrile butadiene styrene, polymethyl methacrylate, and mixtures of two or more of the above materials.

8. The wear-resistive housing of claim 1, wherein said hardness-improving additive is in a ratio range of about 1% to about 3% in said molding material.

9. A wear-resistive housing for an electronic device, comprising a housing body and a coating material coated on said housing body, said coating material containing a hardness-improving additive of about 0.5 wt % to about 10 wt %, wherein said hardness-improving additive is one selected from the group consisting of: zirconium dioxide, boron nitride, tungsten carbide, and mixtures of two or more of the above.

10. The wear-resistive housing of claim 9, wherein said hardness-improving additive has a particle size of about 100 nm or less in diameter.

11. The wear-resistive housing of claim 9, wherein said coating material further comprises a surface smoothness material selected from the group consisting of: silicon dioxide, sulfides, fluorides, and mixtures of two or more of the above.

12. The wear-resistive housing of claim 11, wherein said coating material contains 500 ppm or more of said surface smoothness material.

13. The wear-resistive housing of claim 9, wherein said coating material contains a material selected from the group consisting of:
   A. anti-bacterium nanometer scale materials having a particle size of about 100 nm or less in diameter;
   B. photo catalysis materials;
   C. negative ion generation materials;
   D. anti-electromagnetic interference materials;
   E. flame retardant materials;
   F. odor and humidity absorption materials;
   G. anti-ultra violet ray materials;
   H. insulation improving materials;
   I. far infrared ray generation materials; and
   J. mixtures of two or more of the above materials.

14. The wear-resistive housing of claim 9, wherein said coating material contains a material selected from the group consisting of:
   A. nanometer scale silver particles in a range of about 1 ppm to about 500 ppm;
   B. zinc oxide, titanium dioxide, or mixtures thereof, in a range of about 200 ppm to about 10,000 ppm;
   C. zinc oxide, titanium dioxide, any metal, or mixtures of two or more thereof, in a range of about 0.1% to about 5%;
   D. tourmaline powder, or mixture of tourmaline and clay, in a range of about 1% to about 20%;
   E. iron oxide, carbon powder, any metal, or mixtures of two or more thereof, in a range of about 10% to about 45%;
   F. aluminum hydroxide, magnesium hydroxide, or mixtures thereof, in a range of about 20% to about 70%, and silicon dioxide, in a range of about 0.5% to about 5%;
   G. active carbon, bamboo charcoal, porous silicate, vermiculite, zeolite, diatomite, or mixtures of two or more of the above, in a range of about 0.1% to about 10%; and
   H. mixtures of two or more of the above materials.

15. The wear-resistive housing of claim 9, wherein said coating material is one selected from the group consisting of polycarbonate, acrylonitrile butadiene styrene, polymethyl methacrylate, and mixtures of two or more of the above materials.

16. The wear-resistive housing of claim 9, wherein said hardness-improving additive is in a ratio range of about 1% to about 3% in said coating material.

* * * * *